(12) United States Patent
Wen et al.

(10) Patent No.: US 6,928,542 B2
(45) Date of Patent: Aug. 9, 2005

(54) METHOD AND SYSTEM FOR STARTING A MULTIPLE PDA OPERATING SYSTEM THROUGH A MENU

(75) Inventors: Say-Ling Wen, Taipei (TW); Chuan-Cheng Chiu, Taipei (TW)

(73) Assignee: Inventec Corporation, Taipei (TW)

( * ) Notice: Subject to any disclaimer, the term of this patent is extended or adjusted under 35 U.S.C. 154(b) by 632 days.

(21) Appl. No.: 09/987,630

(22) Filed: Nov. 15, 2001

(65) Prior Publication Data

US 2003/0093658 A1 May 15, 2003

(51) Int. Cl.[7] .............................................. G06F 9/445
(52) U.S. Cl. ...................................................... 713/2
(58) Field of Search ................................ 713/1, 2, 100; 345/700, 716, 810

(56) References Cited

U.S. PATENT DOCUMENTS 6,178,503 B1 * 1/2001 Madden et al. ................ 713/2
6,367,074 B1 * 4/2002 Bates et al. ................... 711/170
6,374,353 B1 * 4/2002 Settsu et al. ..................... 713/2
6,631,469 B1 * 10/2003 Silvester .......................... 713/2
6,727,920 B1 * 4/2004 Vineyard et al. ............ 345/810
2002/0152372 A1 * 10/2002 Cole et al. ....................... 713/2

* cited by examiner

Primary Examiner—Thuan Du
(74) Attorney, Agent, or Firm—Birch, Stewart, Kolasch & Birch, LLP

(57) ABSTRACT

A method and system for starting a multiple PDA OS through a menu is disclosed. The invention mainly modifies the BIOS booting procedure in a notebook PC installed with multiple OS's. After the notebook PC is turned on, the multiple OS's are detected. These multiple OS's, including a PDA OS and a normal notebook PC basic OS (such as the Windows OS), are displayed on a menu. By ignoring some hardware diagnostic steps during the BIOS booting procedure and only performing hardware diagnoses for those input devices that support menu manipulations, the starting speed of the laptop can be accelerated. The user can thus start any OS by clicking the desired item in the OS menu.

8 Claims, 7 Drawing Sheets

METHOD AND SYSTEM FOR STARTING A MULTIPLE PDA OPERATING SYSTEM THROUGH A MENU

BACKGROUND OF THE INVENTION

1. Field of the Invention

The invention relates to a technique for starting PDA (Personal Digital Assistant) OS (Operating System) and its utilities in a portable PC (Personal Computer), such as a notebook PC or equivalent electronic device. More specifically, in a notebook PC in which multiple PDA OS's are installed, a method and system is proposed to provide an OS menu for the user to select one of the PDA OS's and to start the PDA OS (including the OS's of hand held PC's, pocket PC's and other equivalent small electronic devices).

2. Related Art

With the increase in computer popularity, people often need to use computers to solve problems either at work or at home. In general, two major methods of obtaining information are: (1) from books, newspapers, journals, CD-ROM's, etc; and (2) from the network. However, both of these methods have drawbacks. The information obtained using the first method will become outdated as time progresses. Rapid exchange of information greatly shortens the life cycle of the information. However, such information recorded in media like books cannot be easily updated. The information obtained using the second method, however, continuously changes along with the development of the world, also resulting in some troubles for users. One can see the problems from the following points:

1. Existing personal computer OS's (Operating Systems), such as Windows 98, Windows 2000, Windows XP, Linux, and so on, are complicated despite (or because of) their powerful functions and designs. Moreover, the user operation designs are not intuitive and simple enough. This situation scares people without any computer background because of the obstacles they meet while using these systems.

2. Users who do not understand the network structure do not know where to start their searches. In this case, the user often chooses to use a familiar OS or to install several different OS's in the computer hardware platform. This type of systems is called a dual-OS or a multi-OS. However, this method cannot solve the above problems because a utility is needed to switch between the OS's.

3. PDA's are becoming more popular nowadays. They have properties complementary to the desktop Windows OS, e.g. smaller volume, faster power on, more compact functions, and more convenient to use. Therefore, a method of supporting multiple PDA systems on a notebook PC is an important subject being studiedhe user is then able to enjoy the functions of different PDA systems on the same notebook PC.

SUMMARY OF THE INVENTION

An object of the invention is to provide a technique that can arbitrarily assign and start an OS in a notebook PC on which multiple PDA OS's and the normal OS (such as the Windows OS) are installed.

The disclosed method mainly applies to a notebook PC on which multiple OS's are installed. These OS's include at least one PDA OS (including the OS's of hand held PC's, pocket PC's and other small electronic devices, all of which are hereinafter referred as PDA) and a basic OS. By modifying the BIOS (Basic Input Output System) booting procedure, the OS information installed in the notebook PC is read from the MBR (Master Boot Record) immediately after the power is turned on. The multiple OS information installed in the notebook PC is obtained and listed in a menu on a display. The user can then directly start any OS through this menu.

The disclosed system is mainly built upon a notebook PC on which multiple OS's are installed. Aside from the basic OS (such as the Windows OS) pre-loaded into the notebook PC, the starting procedure of the basic OS, and the power on button for starting the notebook PC, the system further includes:

a PDA OS stored in a storage device of the notebook PC;

a PDA starting procedure, which is pre-loaded into the BIOS of the notebook PC for starting the PDA OS and opening PDA utilities;

an OS detecting procedure, which is pre-loaded into the BIOS of the notebook PC for the notebook PC to detect installed multiple OS's and to list the OS's in a menu on a display, whereby the user can select and start any one of the OS's using input devices; and a quick hardware diagnostic procedure, which is pre-loaded into the BIOS of the notebook PC to perform hardware diagnoses for the input devices that support such menu manipulations, skipping complicated hardware diagnosis steps in the normal starting procedure of the notebook PC, so as to accelerate the speed of starting the notebook PC.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4 is a flowchart showing the operation procedure of the BIOS chip 11 after the power is turned on;

DETAILED DESCRIPTION OF THE INVENTION

Figure 1:
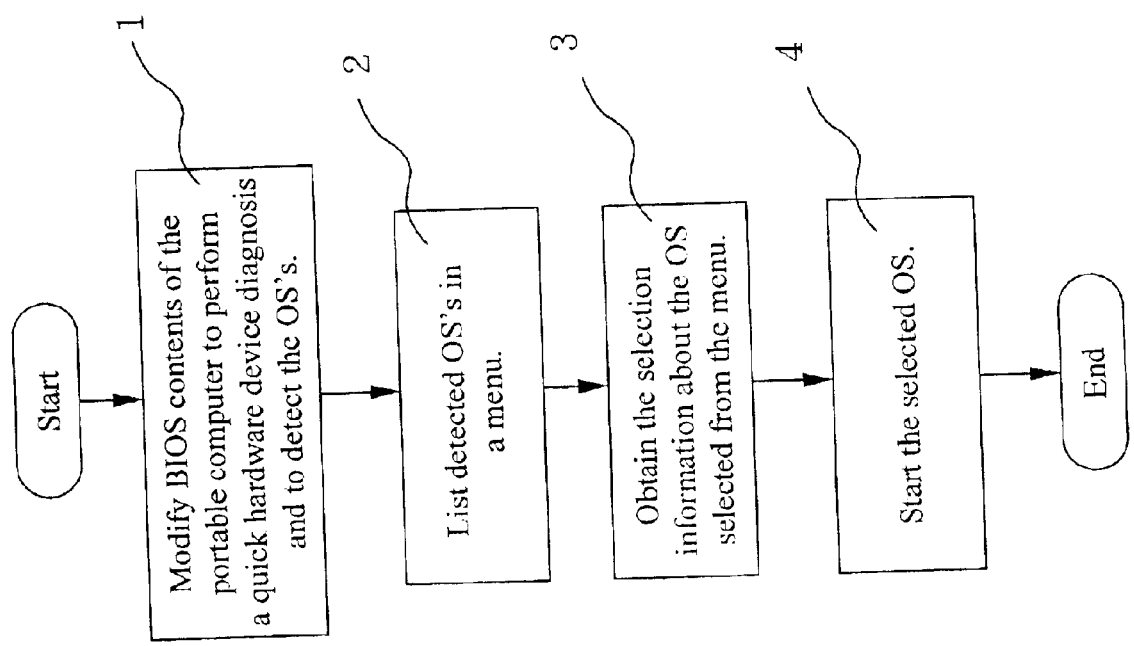
FIG. 1 is a flowchart showing the steps for implementing the invention.

With reference to FIG. 1, the disclosed method mainly applies to a notebook PC on which multiple OS's are installed, including at least one PDA OS and a basic OS pre-loaded into the notebook PC (such as the Windows OS). The following steps are taken to achieve the goal of starting an OS from a menu with multiple OS's:

1. The BIOS contents of the notebook PC, particularly the contents in the booting block, are modified to implement the following functions: (1) skipping some hardware device diagnosis steps in order to speed up the notebook PC system power on; and (2) detecting multiple OS's installed on the notebook PC.
2. The detected multiple OS's are listed in a menu on an output device such as a display or other equivalent device.
3. The system obtains information about the OS selected by the user from the menu (e.g. the PDA OS). The user can assign any OS in the menu to be started using input devices such as a mouse, keyboard, touch-control monitor, or other equivalent device.
4. The OS selected by the user is then started.

Figure 2:
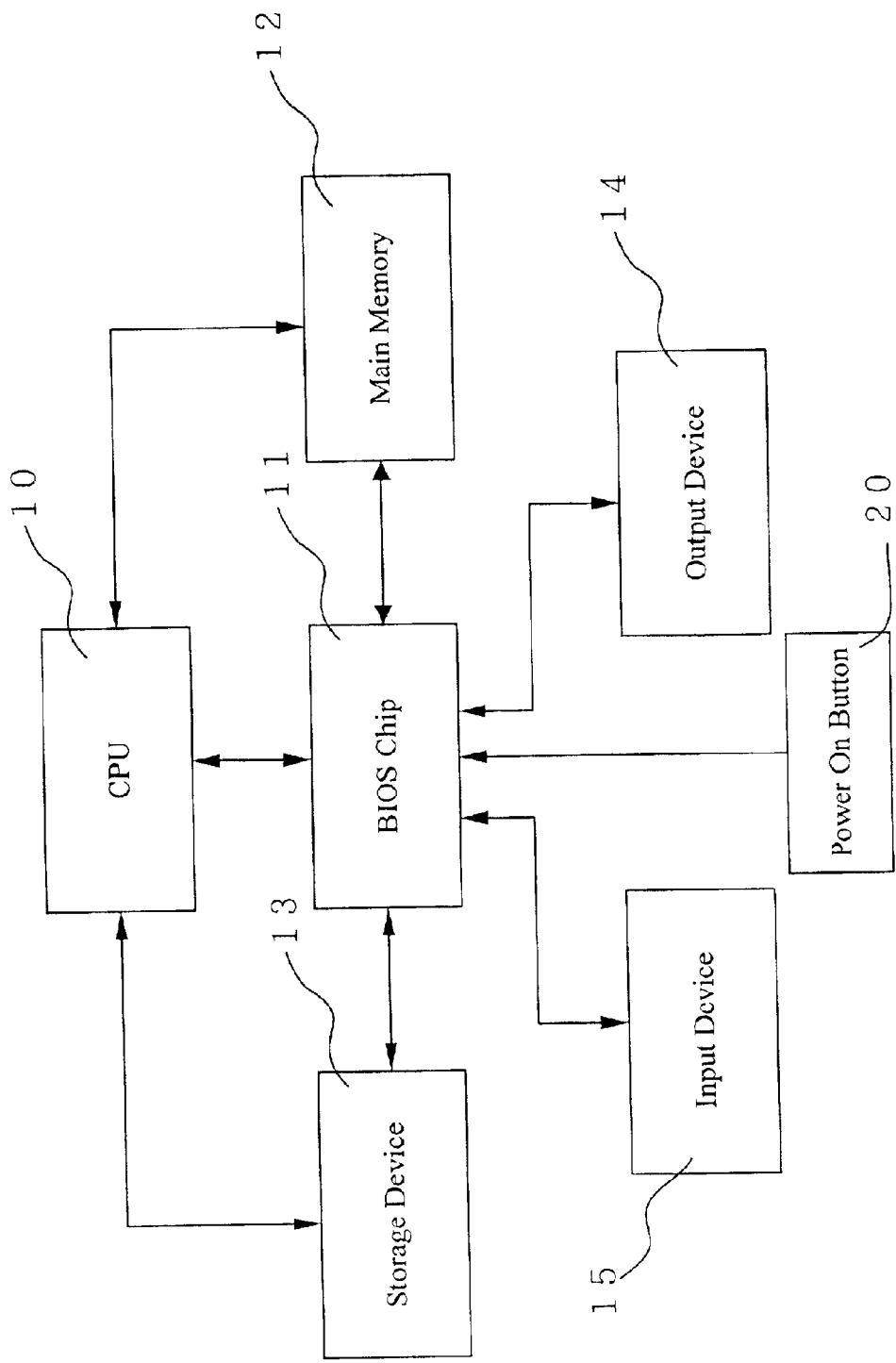
FIG. 2 shows a hardware structure of the invention.

As shown in FIG. 2, the hardware structure using the disclosed technique is mainly based upon the basic hardware devices of current notebook PC's. The hardware structure includes at least: a CPU (Central Processing Unit) 10, a BIOS (Basic Input Output System) chip 11, main memory 12, a storage device 13 (e.g. HD, CD-ROM, memory or other recording media), a power on button 20, an output device 14 (e.g. display, touch-control monitor or other equivalent device), and an input device 15 (e.g. mouse, keyboard, touch-control monitor or other equivalent device).

Figure 3:
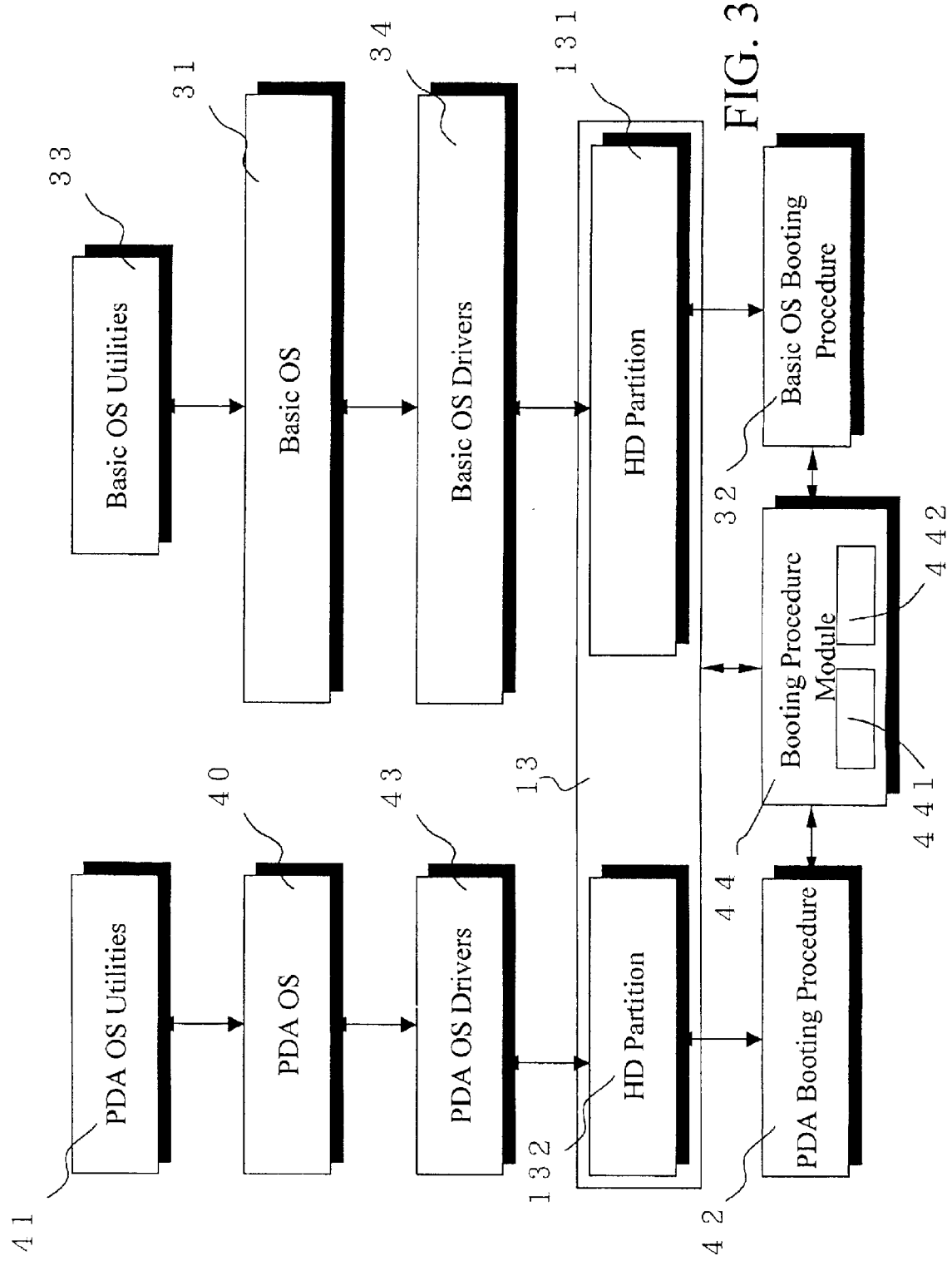
FIG. 3 shows a system structure of the invention.

With reference to FIG. 3, the system of the invention includes: a basic OS (e.g. Windows OS) 31 pre-loaded into the notebook PC, a basic OS booting procedure 32, utilities 33 for the basic OS 31, and a drivers 34 for the basic OS 31. In addition, the system also includes:

a PDA OS 40 stored in the storage device 13 of the notebook PC 13;

utilities 41 for the PDA OS;

a PDA booting procedure 42 pre-loaded into the BIOS chip 11 of the notebook PC for starting the PDA OS 40 and its utilities 41;

drivers 43 for the PDA OS 41; and a booting procedure module 44 pre-loaded into the BIOS chip 11 of the notebook PC, which includes: a quick hardware diagnostic procedure 441 to speed up the notebook PC power on by skipping some hardware device diagnostic steps, and an OS detecting procedure 442 for detecting multiple OS's already installed in the notebook PC (e.g. the pre-loaded Windows OS 31 and the PDA OS 40) and showing them in a menu on the output device 14.

The basic OS-related software, including the utilities 33 and the drivers 34, and the PDA OS-related software, including the utilities 43 and the drivers 44, are separately stored in the storage device 13 of the notebook PC. It is preferable to store them in different HD partitions 131 and 132 of the HD. The PDA booting procedure 42 and the booting procedure 32 of the basic OS 31 are stored together in the BIOS chip 11 of the notebook PC.

Figure 4:
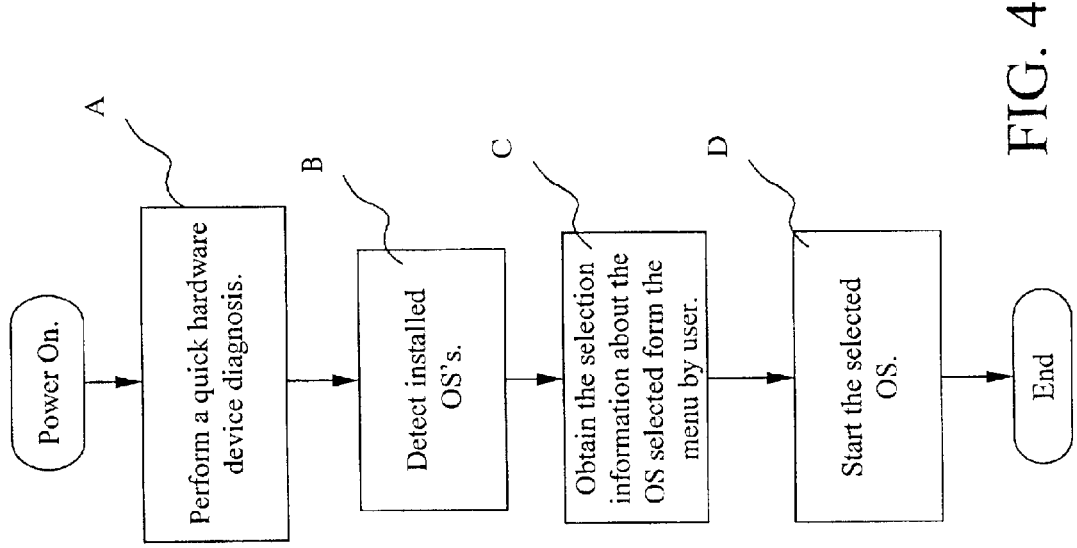

FIG. 4 shows a notebook PC in which the disclosed techniques are implemented. After the power is turned on, the operations performed by the BIOS chip 11 includes the steps of:

A. running partial hardware diagnosis, which, through the quick hardware diagnostic procedure, only performs hardware diagnosis for a few input devices 15 that support menu operations (e.g. mouse, keyboard, touch-control monitor, etc) in order to accelerate the power on speed of the notebook PC by skipping complicated hardware diagnosis in normal booting procedures of the notebook PC;

B. detecting OS's already installed in the notebook PC (e.g. the pre-loaded Windows OS 31 and the PDA OS 40) through the OS detecting procedure 442 and listing them in a menu on an output device 14;

C. obtaining the selection information about the OS (e.g. a PDA OS) selected by the user from the menu; and D. starting the OS selected by the user.

The OS detecting procedure 442 obtains information of all the OS's installed in the storage device 13 of the notebook PC by reading the OS partition messages stored in the MBR (Master Boot Record).

According to the selection result in step C, the BIOS chip 11 runs the PDA booting procedure 42 or the basic OS booting procedure 32 to start the PDA OS 40 and its utilities 41 or the basic OS 31 and its utilities 33, depending on whether the user selects the PDA OS or the basic OS 31 from the menu.

Figure 5:
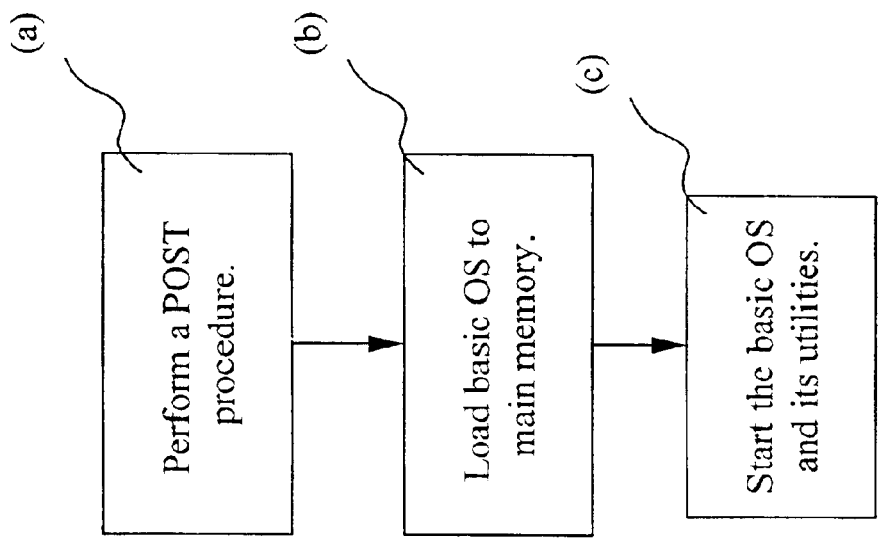
FIG. 5 is a flowchart showing the steps of starting the basic OS and its utilities.

The booting procedure 32 of the basic OS 31 is executed differently from the booting procedure 42 of the PDA OS 40. As shown in FIG. 5, the booting procedure of the basic OS 31 includes the steps of:

(a) performing a POST (Power On Self Test) procedure;

(b) loading the pre-loaded basic OS 31 into the main memory 12; and (c) starting the basic OS 31 and running its utilities 33.

Figure 6:
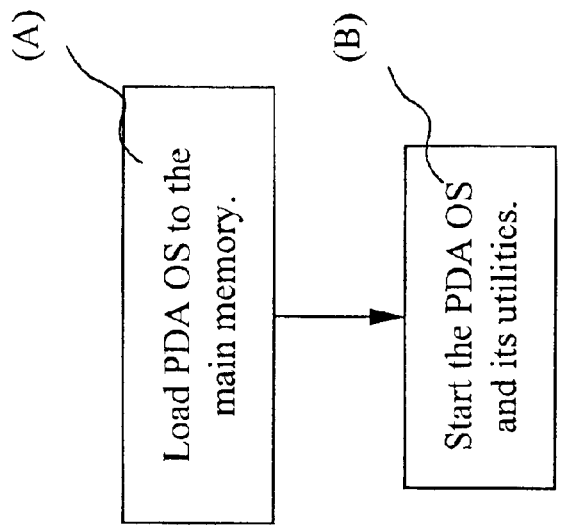
FIG. 6 is a flowchart showing the steps of starting the PDA OS and its utilities.

As shown in FIG. 6, the booting procedure of the PDA OS includes the steps of:

(A) loading the pre-loaded PDA OS 40 into the main memory 12; and (B) starting the PDA OS 40 and running its utilities 41.

From the above description, one sees that complicated hardware diagnostic steps are performed at the beginning of starting the basic OS 31. This is the so-called POST. It mainly tests the size of the memory, the defects in the memory, the keyboard functions, the display interface card type, the types and models of the hard drive and floppy disk drive, and the functions of the interrupt controller and timer. If there is any conflict between the interface card settings and the host, a warning message will be displayed or the system cannot be loaded. For printers, the tests include whether the print head is movable, if any paper is jammed inside, and whether the printer is connected to a computer. On the other hand, if the PDA OS 40 is started through the PDA booting procedure 42, these complicated hardware diagnostic steps are skipped, and the PDA system 40 pre-loaded into the storage device 13 (e.g. HD) of the notebook PC is directly started. The PDA utilities 41 are also loaded to quickly enter the PDA operating environment.

Figure 7:
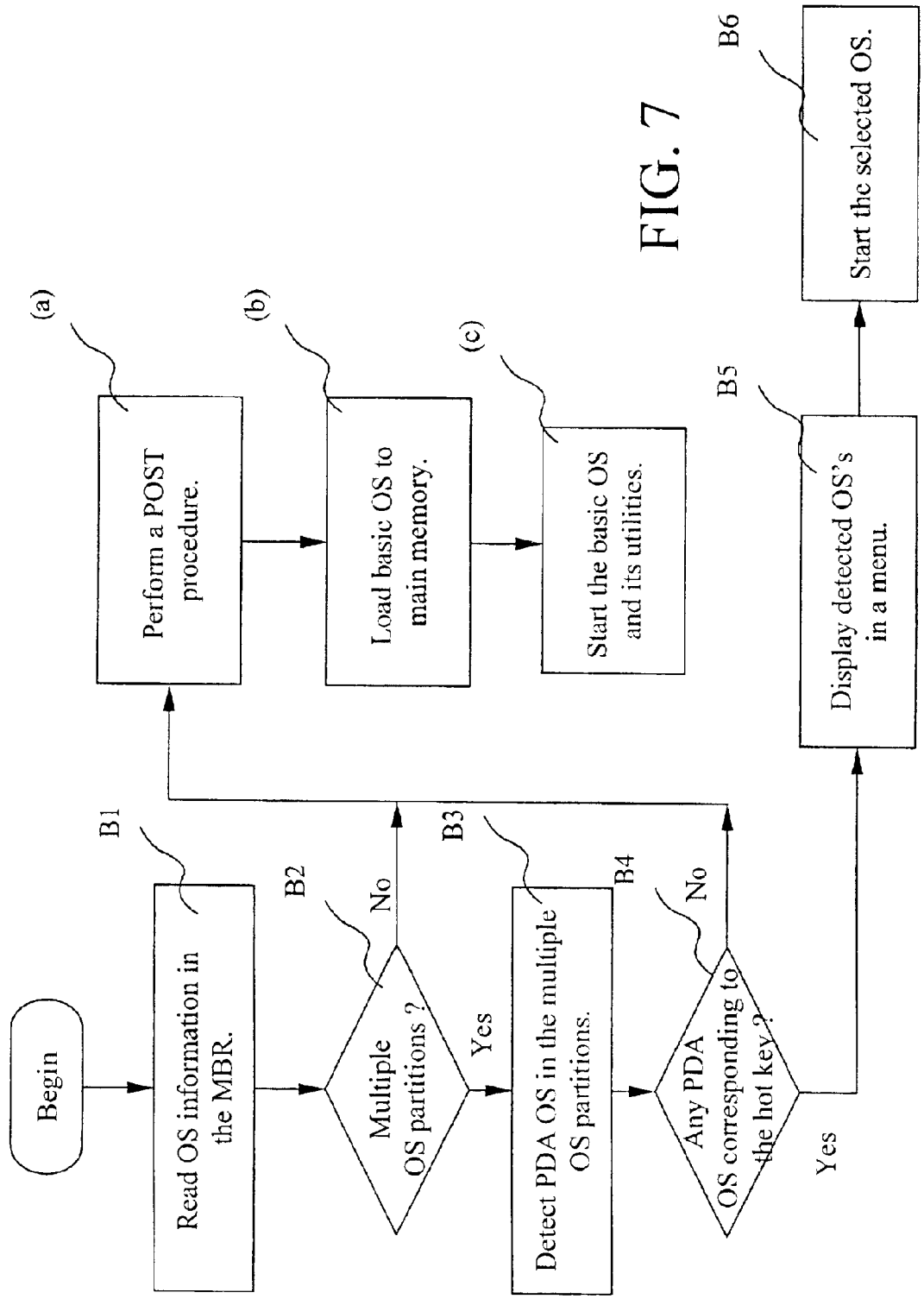
FIG. 7 is a flowchart of another embodiment showing the steps of staring a PDA OS and its utilities using a hot key.
Figure 8:
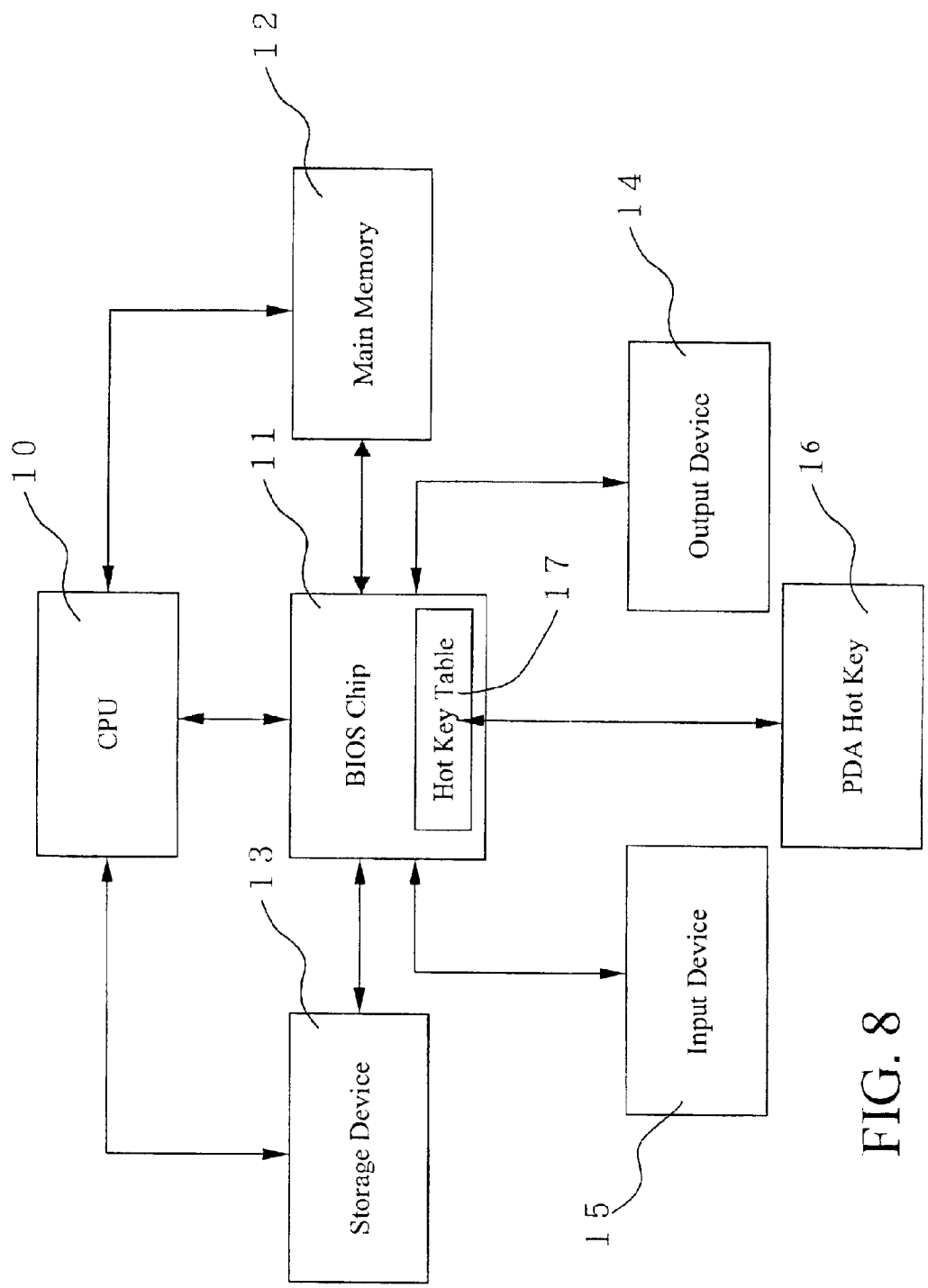
FIG. 8 is the hardware structure of another embodiment, showing the structure of adding a PDA hot key.

FIG. 7 shows a flowchart of another embodiment of the invention, which is based upon the procedure in FIG. 4. It further provides PDA hot keys 16 for directly starting a specific PDA OS 40 after turning on the power (see FIG. 8). The number of PDA hot keys 16 is determined by the number of OS's installed in the notebook PC. Each PDA hot key 16 has a unique ID, which is stored in a hot key table 17 in the BIOS chip 11. When the user presses any of the PDA hot keys 16, the BIOS identifies the PDA OS from the hot key table 17 according to the PDA hot key 16 being pressed. The assigned PDA OS is then started. The detailed procedure includes the steps of:

B1. reading the information of all the OS's installed in the storage device 13 of the notebook PC from the MBR.

B2. determining whether there are multiple OS partitions and continuing to the next step if there are, or otherwise running the booting procedure 32 of the basic OS 31 to start the basic OS;

B3. detecting the PDA OS's 40 in the multiple OS partitions;

B4. detecting any PDA hot key 16 being pressed, identifying the PDA OS from the hot key table 17 accordingly, and starting the assigned PDA OS and its utilities 41;

otherwise continuing to the next step directly;

B5. displaying the detected multiple OS's in a menu on an output device 14 for the user to select the OS to be started through an input device 15; and B6. starting the OS selected by the user.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of starting a multiple PDA OS through a menu for starting an OS in a portable computer installed with multiple OS's including at least one PDA OS and a basic OS, which comprises the steps of:

(1) modifying BIOS contents of the portable computer to (a) skip some hardware device diagnosis steps to accelerate the power on speed, and (b) detect the multiple OS's pre-loaded in the portable computer;

(2) providing PDA hot keys, each of which directly starts a unique PDA OS after power is turned on;

(3) determining whether there are multiple OS partitions and continuing to the next step if there are; otherwise, starting a booting procedure of the basic OS;

(4) detecting a PDA OS in the multiple OS partitions;

(5) detecting if any of the PDA hot keys is pressed and starting the PDA OS corresponding to the PDA hot key; otherwise, continuing to the step (6);

(6) listing the detected multiple OS's in a menu on an output device of the portable computer for a user to select;

(7) obtaining the selection information about an OS selected by the user from the menu; and (8) starting the OS selected by the user.

2. The method of claim 1, wherein the step of modifying BIOS contents further includes the step of establishing a quick hardware diagnosis procedure and an OS detecting procedure.

3. The method of claim 2, wherein the quick hardware diagnosis procedure only performs hardware diagnosis for input devices that support menu operations so as to accelerate the power on speed of the portable computer.

4. The method of claim 3, wherein each of the input devices is selected from the group consisting of a mouse, a keyboard, and a touch-control monitor.

5. The method of claim 2, wherein the OS detecting procedure obtains information of all the OS's pre-loaded in the portable computer by reading OS partition information stored in the MBR (Master Boot Record).

6. The method of claim 1, wherein the number of PDA hot keys is determined by the number of OS's installed in the portable computer.

7. The method of claim 1, wherein the correspondence between the PDA hot keys and the OS's is defined by a hot key table in a BIOS chip.

8. The method of claim 1, wherein the booting procedure of the basic OS further includes the step of running a POST (Power On Self Test) procedure after power is turned on.

* * * * *